Jan. 13, 1953 W. A. FORDE 2,625,174
PILOT OPERATED RELIEF VALVE
Filed July 28, 1947
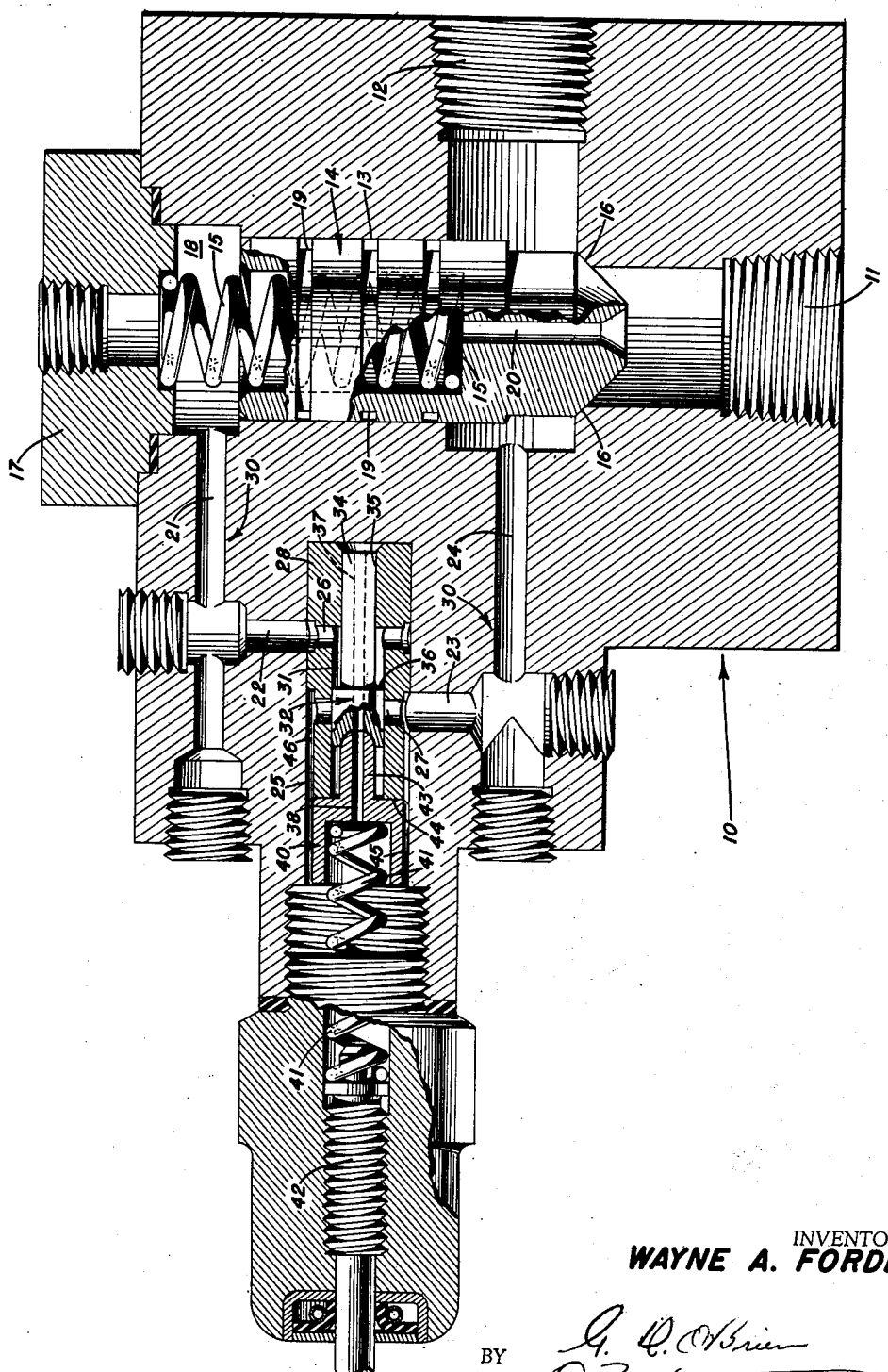
INVENTOR
WAYNE A. FORDE
BY
ATTORNEYS Patented Jan. 13, 1953

2,625,174

UNITED STATES PATENT OFFICE 2,625,174

PILOT OPERATED RELIEF VALVE

Wayne A. Forde, Washington, D. C.

Application July 28, 1947, Serial No. 764,187

4 Claims. (Cl. 137—491)

(Granted under Title 35, U. S. Code (1952), sec. 266)

This invention relates to improvements in relief valves and more particularly to such improvements in the prior art pilot control relief valves that are directed to the elimination of hammering and other noises inherent in their operation. Moreover, this invention is directed to a relief valve that is more quiet in operation than are the valves of the prior art and therefore less subject to wear and more reliable in operation.

Accordingly, it is an object of this invention to provide a relief valve that will operate dependably and effectively over long periods of time without hammering or chattering.

Further object of this invention is to provide a relief valve of rugged construction wherein wear is minimized.

To achieve the foregoing objects of this invention the fluid pressure that is under control by the relief valve is bled through a spring influenced piston into a pressure control chamber formed at the top surface of the piston so that a differential of the fluid pressure will act upon the piston in a direction tending to maintain the valve closed. Fluid pressure within the control chamber is utilized to actuate the pilot valve which operates to release this fluid pressure thereby permitting the relief valve to open. In accordance with my invention, the pilot valve is also of the sliding plunger type and is positioned in a passageway that connects the fluid pressure chamber to the outlet. The plunger constituting the pilot valve is spring biased to a position closing this passageway and is provided with a surface exposed to the fluid pressure within the control chamber, against which surface said pressure acts to move the plunger to release the fluid pressure of the control chamber thereby permitting the relief valve to open. It has been my experience that it is exceedingly difficult to preclude leakage of fluid past the piston or plunger type valve, especially after the valves have been in service for some time and that the leakage of such fluid frequently (due to faulty construction or design of the valve) prohibits its proper functioning by preventing the valve from closing after the pressure of the actuating fluid has been reduced to a safe value.

The pilot plunger of this invention is constructed to operate in a sleeve so that the leakage of fluid between the valve and the sleeve will be vented to the outlet. This construction precludes this fluid from acting upon the plunger tending to force it to an open position and also prevents the formation of a hydraulic block preventing the closure of the pilot plunger. By the construction hereinafter set forth, advantage is taken of the leakage of fluid past the pilot plunger effectively to throttle the movement of said plunger by either a sudden excessive pressure in the control chamber or by the action of the spring. For example, as the pilot plunger is moved to open the passageway releasing the pressure in the control chamber, the action of the spring in returning the plunger to its position closing this passage will be throttled by the flow of fluid entrapped by the plunger through a suitable vent in the plunger. This throttling action prevents hammering that was formerly associated with the pilot control relief valves of the prior art and minimizes wear, thereby insuring quiet and dependable operation of the valve. It will be noted also, as the description of this invention proceeds, that a guide member is utilized to transmit the spring pressure which is of such construction that it acts against fluid pressure entrapped between the guide and the sleeve to prevent hammering of the guide against the plunger as it approaches the end of its travel. The fluid pressure entrapped is vented to the outlet through suitable grooves.

The invention will be better understood by referring to the accompanying drawing wherein a single elevational view in cross section illustrates a preferred embodiment.

Referring now to the drawing, a valve body member 10 is adapted to be tapped into a fluid pressure line of the system for which the valve is designed to protect by means of a suitable pipe threaded or flange mounted into the valve inlet and outlet ports 11 and 12 forming a channel through said body member. The valve may be installed, for example, on the high pressure delivery side of either a variable or constant delivery hydraulic pump and preferably as near to the pump as possible so as to expose only a small section of the high pressure delivery line to any possible excessive pressure. The outlet port 12 of the valve should be connected by a return line to the reservoir with the return line preferably below the liquid surface level within the reservoir. A main bore 13 communicates with the inlet and outlet and is adapted to receive the valve piston or plunger 14 which is biased by means of a compression spring 15 firmly into engagement with the seat 16 of the inlet. The piston 14 is shown provided with a series of grooves 19 adapted to retain a liquid to effect a seal between the side walls of the bore 13 and the cylindrical piston 14. The upper end of the bore is capped by a bonnet 17 to retain the spring 15 and to define a fluid pressure control chamber 18. A vent 20 extends into the body of the valve member and communicates the fluid pressure control chamber 18 with the inlet port 11 so that the fluid pressure at the inlet will be acting upon both the front and the back surface of the piston 14. The seat 16 is of such size that the total surface area of the piston at the inlet port is less than the effective surface area of the top portion of the piston whereby a differential of the fluid pressure at the inlet port 11 will act upon the piston tending to force the piston firmly upon its seat thereby maintaining the valve closed.

A fluid passage 30 is also formed by the tapped drilled openings 21, 22, 23 and 24; and the secondary bore 25 to communicate the fluid pressure chamber 18 with the outlet port 12. As illustrated in the drawing a sleeve 28 is inserted into the secondary bore 25 so that the axially spaced and radially directed fluid ingress and egress openings 26 and 27 are concentric with their respective drilled openings 22 and 23. The inner diameter of the sleeve 28 is enlarged over a region indicated at 31 to receive the plunger 32. The plunger 32 has a portion 34 of smaller diameter which is fitted into the sleeve at 35. By means of this construction the portion 34 of the plunger 32 is opposite of the opening 26 of the sleeve 28 which openings are drilled into the sleeve over that portion that has an enlarged internal diameter, so that the fluid pressure in the control chamber is directed on to the flange surface 36 formed on the plunger 32. The enlarged diameter portion of the plunger cooperates with openings 27 of the sleeve 28 by sliding action thereover to cover and uncover said openings and thereby close and open the connection of passages 30 to the outlet port 12. I have observed that difficulties are experienced in maintaining piston or plunger type valves fluid-tight and accordingly I make provision of venting or bleeding off a small amount of fluid that leaks around the lower portion 34 of the plunger. The path for venting this fluid is provided by drilling a small vent hole 37 through the piston and by having also a hole 38 drilled in the guide member 40 communicating therewith.

The guide 40 serves to transmit the pressure of the compression spring 41 to the plunger so that the plunger will be moved only when the fluid pressure acting upon the surface of the flange 36 exceeds a predetermined compressional setting of the spring 41 which compressional setting can be adjusted by means of the screw threaded 42.

The guide 40 is constructed so that a portion 43 of reduced external diameter abuts the plunger thereby transmitting the spring pressure to the plunger to maintain the plunger in the position blocking the opening 27 of the sleeve 28. This guide 40 prevents the spring pressure from forcing the plunger to the end of its travel in the sleeve by having the portion 43 of such length that the flange 44 will abut the end surface of the sleeve before the plunger 34 reaches the end of its travel in the sleeve. In order that the fluid pressure vented through the aligned openings 37 and 38 may be led to the outlet 12 the outer surface of the guide is provided with a plurality of grooves 45, which extend along the surface of the guide in registry with similar grooves 46 that are cut in the outer surface of the sleeve and which communicate with the opening 27 and the drilled passage 23.

The operation of the valve is such that the fluid pressure at the inlet port is transmitted through the vent 20, the portion of the passage 30 formed between openings 21, 22 and 26, into the interior of the sleeve 28. If this fluid pressure acting upon the effective surface area of the flange 36 exceeds the force of compressional spring 41, the plunger 34 will be moved against the force of the spring to uncover the port 27 and to open the passageway 30 to the outlet port 12 for reducing the fluid pressure in the chamber 18. The size of the passageway 30 is large compared with the size of the vent 20 so that the fluid pressure in the control chamber will be reduced by the flow of fluid through the passageway 30. The release of this pressure in the control chamber 18 will permit the piston 14 to be moved off its seat 16 by the fluid pressure acting at the inlet, thereby opening the inlet port 11 into communication with the outlet port 12.

As soon as the pressure in the control chamber is reduced, the fluid pressure acting upon the flange 36 will be also similarly reduced so that the force of the compression spring 41 will be predominant, and will move the plunger 34 into the position shown in the drawing wherein the port 27 is closed. Since the flow of fluid between the plunger 34 and the inner walls of the sleeve cannot be effectively avoided, that fluid occupying the space vacated by the movement of the piston by fluid pressure to open the port 27 now serves to cushion the rear of the plunger since this fluid must now be forced out through the small vent 37—38 in the plunger and guide respectively and through the grooves 45—46 of the guide and sleeve respectively, thus providing a dashpot for the closing action of this valve. Before the plunger 34 reaches the end of its travel the flange 44 of the guide 40 will engage the end surface of the sleeve 28. Consequently there is little or no noise present when the valve closes because fluid will also fill the space between the guide 40 and the sleeve 28 to cushion any metallic hammering of these two elements. Note should be made also of the fact that all the fluid which flows through the vents 37 and 38 can be passed through the longitudinal grooves 45 and 46 to the outlet port 12, thereby precluding the formation of a hydraulic block at either end of the stock of the pilot plunger 34.

While I have described a preferred constructional arrangement of my invention, it is to be understood that numerous variations and arrangements of parts might be made without departing from the spirit or scope of my invention as set forth in the appended claims.

The invention herein described may be manufactured and used by or for the Government of the United States of America for governmental purposes without the payment of any royalties thereon or therefor.

I claim:

1. In combination, a primary valve and a sliding piston type pilot control valve therefor; said primary valve comprising a body member having a control chamber therein, a channel therethrough and a seat, a piston reciprocable therein toward and away from said seat for controlling fluid flow through said channel and having a vent therethrough for providing fluid communication between the front face of the piston and said control chamber, and a yieldable pressure means for urging said piston into said seat; said piston type pilot control valve comprising a body member having ingress and egress ports formed therein, a plunger carried by said body member for sliding reciprocation therealong, a piston portion of said plunger cooperating with said body member for sliding action along a portion thereof substantially adjacent said egress port to close and open the valve in response to fluid pressure applied to said ingress port by covering and uncovering said egress port, said housing providing a dashpot chamber connected to said egress port for fluid flow therebetween and receiving one end of said plunger, and means urging said piston portion over said egress port and said end of said plunger into said dashpot chamber, thereby providing a smooth cushioned pilot valve closing action; and means providing fluid communication between said control chamber and said pilot valve ingress port, the fluid pressure in said chamber thereby controlling said pilot valve, the opening of said pilot valve providing a pressure differential between the opposite faces of said primary valve piston to open said primary valve and the smooth cushioned closure of said pilot valve causing a gradual diminution of said pressure differential resulting in a closure of said primary valve under a small urging force.

2. In combination, a primary valve and a sliding piston type pilot control valve therefor; said primary valve comprising a body member having a control chamber therein, a channel therethrough and a seat, a piston reciprocable therein toward and away from said seat for controlling fluid flow through said channel and having a vent therethrough for providing fluid communication between the front face of the piston and said control chamber, and means for urging said piston into said seat; said piston type pilot control valve comprising a body member having ingress and egress ports formed therein, a plunger carried by said body member for sliding reciprocation therealong, a piston portion of said plunger cooperating with said body member for sliding action along a portion thereof substantially adjacent said egress port to close and open the valve in response to fluid pressure applied to said ingress port by covering and uncovering said egress port, said housing providing a dashpot chamber connected to said egress port for fluid flow therebetween and receiving one end of said plunger, and means for urging said piston portion over said egress port and said end of said plunger into said dashpot chamber, thereby providing a smooth cushioned valve closing action; and means providing fluid communication between said control chamber and said pilot valve ingress port for making said pilot valve responsive to control chamber fluid pressure for actuating said primary valve in response thereto.

3. For use with a fluid pressure relief valve of the type including an inlet duct, an outlet duct, a valve port connecting said ducts, a control chamber having a vent passageway, a cylindrical bore connecting said control chamber and said outlet duct, a piston reciprocably slidable in said bore into and out of engagement with said seat and provided with a restricted through conduit adapted to transmit inlet pressure fluid to said control chamber, a spring biasing said piston toward said seat, said piston being adapted to control the relief of said fluid pressure responsive to changes in pressure differences between said inlet duct and said control chamber; a pilot control valve for use in said vent passageway to regulate said control chamber pressure and thus control said pressure relief valve, said pilot control valve comprising a body having a bore including a cylindrical fluid passageway intermediate the ends of the bore and vent passageway fluid inlet and outlet ports communicating with said cylindrical fluid passageway at spaced zones therealong, the bore of said pilot valve body at one end being reduced in diameter and serving as a dashpot, and at the opposite end being enlarged in diameter and providing an annular shoulder, a plunger including a piston and a reduced stem providing an annular surface, the piston and stem of said plunger being reciprocably slidably fitted in said cylindrical fluid passageway and said reduced bore end respectively, said annular surface being subject to vent passageway inlet fluid pressure urging the piston of said plunger away from said fluid outlet opening, means urging the piston of said plunger toward said fluid outlet opening including a spring and a spring guide having a cylindrical spring receiving socket reciprocably slidable in said enlarged bore end and a pushrod adapted to engage said plunger, said socket being provided with an annular abutment adapted to engage said annular shoulder to limit spring urged movement of said plunger piston beyond a position wherein said fluid outlet port is closed and to limit spring urged movement of said stem into said dashpot, said pushrod and stem being hollow to provide a restricted passageway conducting fluid between opposite ends of the bore of said pilot control valve body, and means conducting fluid between the enlarged end of said last-mentioned bore and said outlet opening, whereby outlet port closing movement of said plunger piston under the influence of said last-mentioned spring is retarded by said dashpot and fluid in said dashpot is permitted to escape through said plunger piston, said pushrod and said fluid conducting means.

4. A fluid pressure actuated valve comprising a body having a bore including a cylindrical fluid passageway intermediate the ends of the bore and fluid inlet and outlet ports communicating with said passageway at spaced zones therealong, said bore at one end being reduced in diameter and serving as a dashpot, and at the opposite end being enlarged in diameter and providing an annular shoulder, a plunger including a piston and a reduced stem providing an annular surface, said piston and stem being reciprocably slidably fitted in said fluid passageway and said reduced bore end respectively, said annular surface being subject to inlet fluid pressure urging said piston away from said fluid outlet opening, means urging said piston toward said fluid outlet opening including a spring and a spring guide having a cylindrical spring receiving socket reciprocably slidable in said enlarged bore end and a pushrod adapted to engage said plunger, said socket being provided with an annular abutment adapted to engage said annular shoulder to limit spring urged movement of said piston beyond a position wherein said fluid outlet port is closed and to limit spring urged movement of said stem into said dashpot, said pushrod and stem being hollow to provide a restricted passageway conducting fluid between opposite ends of said bore, and means conducting fluid between the enlarged end of said bore and said outlet opening, whereby outlet port closing movement of said piston under the influence of said spring is retarded by said dashpot.

WAYNE A. FORDE.

REFERENCES CITED

The following references are of record in the file of this patent:

UNITED STATES PATENTS

| Number | Name | Date |
| --- | --- | --- |
| 1,970,131 | Douglas | Aug. 14, 1934 |
| 2,047,185 | Ballard | July 14, 1936 |
| 2,080,824 | Kane | May 18, 1937 |
| 2,351,871 | Parker | June 20, 1944 |
| 2,388,406 | Haberland | Nov. 6, 1945 |